March 11, 1941.  W. E. WOODARD  2,234,614
VALVE MOTION MECHANISM FOR FLUID PRESSURE ENGINES
Filed July 5, 1938  10 Sheets-Sheet 6

INVENTOR
William E. Woodard
BY
Symmestvedt + Lechner
ATTORNEYS

March 11, 1941.  W. E. WOODARD  2,234,614

VALVE MOTION MECHANISM FOR FLUID PRESSURE ENGINES

Filed July 5, 1938   10 Sheets-Sheet 9

INVENTOR
William E. Woodard
BY
Synnestvedt & Lechner
ATTORNEYS

March 11, 1941. W. E. WOODARD 2,234,614
VALVE MOTION MECHANISM FOR FLUID PRESSURE ENGINES
Filed July 5, 1938 10 Sheets-Sheet 10
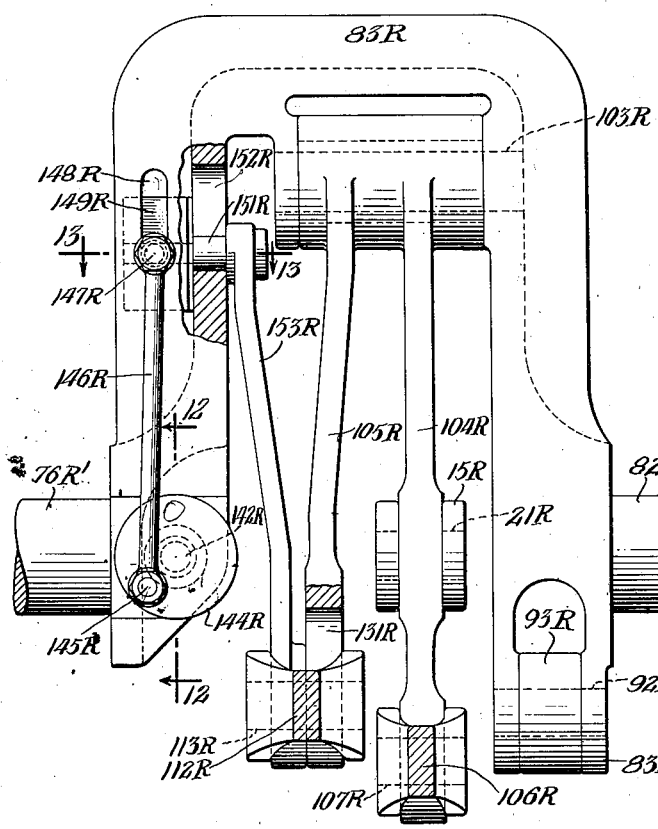
Fig. 10.
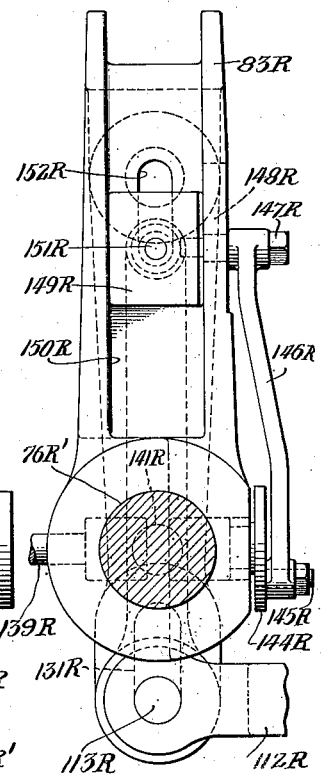
Fig. 11.
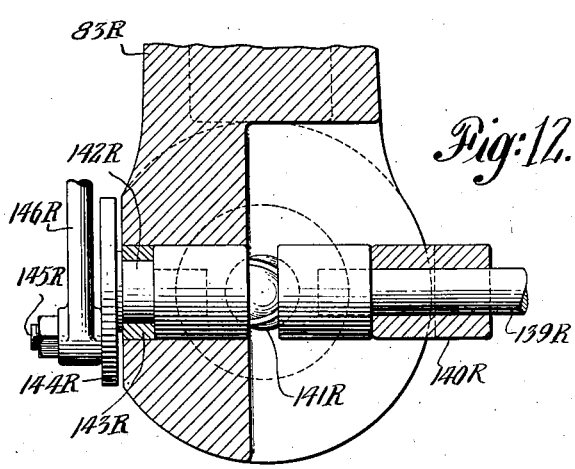
Fig. 12.
Fig. 13.
INVENTOR
William E. Woodard
BY
Synnestvedt & Lechner
ATTORNEYS Patented Mar. 11, 1941

2,234,614

UNITED STATES PATENT OFFICE 2,234,614

VALVE MOTION MECHANISM FOR FLUID PRESSURE ENGINES

William E. Woodard, Forest Hills, N. Y.

Application July 5, 1938, Serial No. 217,360

23 Claims. (Cl. 121—116)

*Field of the invention*

This invention relates to valve motion mechanism for fluid pressure engines, and more particularly to adjustable and reversible valve gear for actuating the valve means of locomotive engines.

The invention is especially well adapted for use in double-acting two-cylinder steam locomotives having poppet valves for controlling the steam distribution and including separate valves for the admission and for the exhaust, though it is not limited in its broader aspects to application to this particular type of equipment. Certain of the more specific aspects of the invention, however, have a peculiar co-operative relationship to such a locomotive engine, and even more particularly to one in which the valve gear is driven solely by reciprocating parts at the two sides of the engine (such as the two crossheads) and wherein the valve gear actuates the separate steam admission and steam exhaust poppet valves through the intermediation of oscillating cams; and therefore the invention will be herein illustrated and described with reference to such a locomotive engine.

*Objects and advantages*

The primary purpose of the invention is to effect an improvement in the valve events of a fluid pressure engine, with a view to increasing the efficiency of operation and reducing the strains, vibrations and shocks upon the engine and the locomotive as a whole, particularly at high operating speeds; and to accomplish this by mechanism of relatively light weight, a further result of the light weight and of the reduction in operating stresses and strains being a measurable reduction in wear and tear upon the track, the improvements being especially marked in the operation of large high-speed locomotives. More particularly, the invention contemplates improving the relationship between the different valve events, especially the timing of the release and compression events with relation to the admission and cut-off, as by the securing of later release and compression than heretofore obtained, preferably throughout most of the range of cut-off adjustment, but at least at early cut-off settings such as are normally used during high-speed operation.

For a better understanding of the foregoing objects and others hereinafter to be mentioned, as well as a full comprehension of their importance, brief reference should be made to a few of the characteristics of adjustable and reversible valve gears, such as are employed on locomotives. In such mechanism, a plurality of motions of different phase, such as the motions of a couple of eccentrics, the motions of a crosshead and an eccentric crank, or the motions of a couple of reciprocating parts, are brought together in such manner that the resultant movement imparted to the valve (for example of the slide or piston type) results in the desired actuation of the piston in the associated cylinder, with a reasonable compromise secured between the various valve events (pre-admission, cut-off, release and compression).

Thus, in the customary Walschaert link motion, as applied to a piston-type valve for instance, the valve is reciprocatingly driven by the eccentric crank on the main crank pin, through the intermediation of the oscillating link and the radius rod adjustably coupled thereto for adjustment and reversal of the valve operation, the connection to the valve comprising a combining lever which is coupled also to the crosshead so as to control the lap and lead of the valve. Adjustment of the cut-off, by shifting the radius rod link-block in the link, adjusts all the other valve events, but in a fixed relationship, the combination of the motion of the crosshead and the motion derived from the eccentric crank through the link and radius rod being fixedly determined by the ratio of the arms of the combining lever, which ratio is fixed and identical for all cut-off adjustments and all operating functions of the valve.

It is well recognized that such operation is essentially characteristic of other known types of valve gear, such as the Baker, the Young gear, etc., in which, though the structural parts differ, equivalent functions are secured. Attempts have been made to overcome such limitations by means of valves driven by continuously rotating shiftable cams but the complication of the mechanism has been a serious handicap.

Although "lap" and "lead" (as just above applied to the prior art) are terms not applicable to poppet valves, because of their inherent nature, yet there is a timing of poppet valve operation equivalent to that of the prior art above discussed, as will be seen from examination of the improved valve gear disclosed and claimed in my copending patent application Serial No. 58,504, filed January 10, 1936, which issued as Patent No. 2,136,405 on November 15, 1938. While certain important structural and operational improvements are involved in the invention of said application, especially with regard to the actuation of the valve motion mechanism from the crossheads or equivalent reciprocating parts at opposite sides of the engine, and the combining of motions derived therefrom for actuating and timing the valves, by a novel construction, location and disposition of the parts, yet the said prior application was not directly concerned with improvement of the relationship between the different valve events; or in other words the timing remained similar to that of the prior art. In a subsequent copending application, however (Serial No. 121,398, filed January 21, 1937 which issued as Patent No. 2,138,053 on November 29, 1938), I have disclosed and claimed an improvement in valve gears, specifically adapted to the type of gear shown in the first-mentioned application, by which the relationship of the valve events is improved, the timing of the release and compression events being especially improved in that case by being caused to occur later than is customary, particularly when the valve gear is adjusted for short or early cut-offs. The improvement therein was secured primarily by the utilization of different combining lever ratios for the actuation and timing of the admission and exhaust events respectively; but these ratios were, in that case, fixed ratios, i. e., not arranged for relative adjustment or control during operation.

As compared with all of the prior art known to me (including my two prior filed but copending applications above mentioned, to which reference may be had for a fuller explanation of the purposes and operation thereof), the present invention involves a fundamental improvement in the field of fluid pressure engines, especially of the reversible locomotive type, by the provision, in association with admission valve means and exhaust valve means both actuated by the combined motions derived from a plurality of driven parts moving in different phase relation, of a progressive and/or controllable variation or alteration in the combined motion delivered for the timing of one of said valve means as compared to that delivered for the timing of the other, preferably such a modification of the combined motion being delivered for timing the exhaust valves. More specifically, the invention contemplates combining the plurality of motions actuating the valve gear, in such a way that the separate motions are combined in one ratio for controlling the admission and cut-off and in a different ratio for controlling the release and compression, and making one of said ratios (preferably the latter) variable relative to the other, during the operation of the engine, and this without the necessity of employing shiftable cams and/or shiftable cam shafts.

Still further, since the invention contemplates such controlled variation between the actuation of the exhaust and admission valves in a valve gear which is itself of the adjustable cut-off, and preferably also of the reversible type, the invention further involves the controllable alteration of the combined motion delivered for timing the exhaust valve means relative to that delivered for timing the admission valve means in a predetermined relation to the normal adjustments of cut-off, preferably by means of a common control.

Pursuant to the foregoing, in its more specific aspects the invention contemplates a valve gear wherein the admission and exhaust valves for a given cylinder are timed with respect to the movements of the piston therein by a combination of motions: first, a motion of uniform amplitude and bearing a constant directional relation to the motion of the corresponding piston, said motion being for instance an oscillating one derived preferably from the crosshead driven by said piston; and second, a motion which is capable of being varied in amplitude and of being relatively reversed in direction, which may also be an oscillating motion, preferably derived from a radius rod adjustably coupled with a link driven by the crosshead associated with the piston in the opposite cylinder of the engine; wherein the combining of the motions is preferably effected by a combining lever mechanism, having separate actuating connections from thence to the admission and exhaust valves; and wherein the delivery of motion for timing one of said valves (preferably the exhaust valve), is itself capable of variation. In the present preferred embodiment, herein illustrated, the control over the alteration of the combined motion delivered for timing the exhaust valves is exercised conjointly with the cut-off adjusting and/or the valve reversing mechanism, as by being coupled up for actuation by the reverse lever, or in other words, the modification of the combined motion delivered for timing the exhaust valve means is coordinated with the adjustment of the radius rod link-blocks in the arcuate swinging links of the valve gear (or the equivalent elements).

Still more specifically, the variation in the actuation, timing, or movement, of the exhaust valves is secured by a progressively adjustable member in the series of actuating connections thereto, preferably an adjustable connection to the combining lever which has the effect of altering the ratio of the arms of the combining lever. In the embodiment herein disclosed, this is accomplished by mounting the pivot connection of an exhaust valve operating rod slidably in the combining lever, and progressively adjusting the same by a cam or eccentric device which is coupled up, by suitable flexible-joint means, shafting, gearing, and the like, to the reversing or tumbling shaft, so that when the reverse lever and its reach rod are actuated in the usual manner to secure an earlier cut-off by the admission valves the ratio of the arms of the exhaust combining lever is reduced, and this in either forward or reverse operation.

The invention further involves improvements in the structural parts of the valve gear, such as: the formation of the primary oscillating yokes to a channel-shaped section, not only for strength and lightness, but also to serve as guides for the adjusting means of the present invention; the construction of the cross-over connections, and the disposition of one mostly above the other; the provision of a novel type of link-block, i. e., of a rolling type, which is preferably equipped with needle bearings and is arranged to minimize lost motion, vibration and wear; and the provision of an improved swinging link which when used in conjunction with the said roller link-block may be made smaller and lighter than would otherwise be required.

Many of the foregoing objects and advantages are secured by the invention regardless of the type of valve gear to which the invention is applied. However, the invention when incorporated in a valve gear of the type disclosed in my aforesaid Patent No. 2,138,053 secures all the advantages of said invention conjointly with the further advantages of the present invention. How all these objects and advantages are secured, together with such others as may be incident to the invention, will be evident from the following description, taken together with the accompanying drawings.

*Description of drawings*

Figure 10 is a fragmentary view similar to Figure 9, but on a larger scale, illustrating the assembly of oscillating yoke, combining lever, and mechanism for adjusting the ratio of lever arms for the operation of the exhaust valves (for the right-hand side of the locomotive).

Figure 12 is an enlarged detail view taken on the line 12—12 of Figure 10.

Figure 13 is an enlarged detail view taken on the line 13—13 of Figure 10.

Figure 14 is a fragmentary view similar to Figure 10, but showing the parts in a different position of adjustment, to illustrate the controllable variation of the exhaust combining lever ratio.

*Description of typical environment of the invention*

Figure 1:
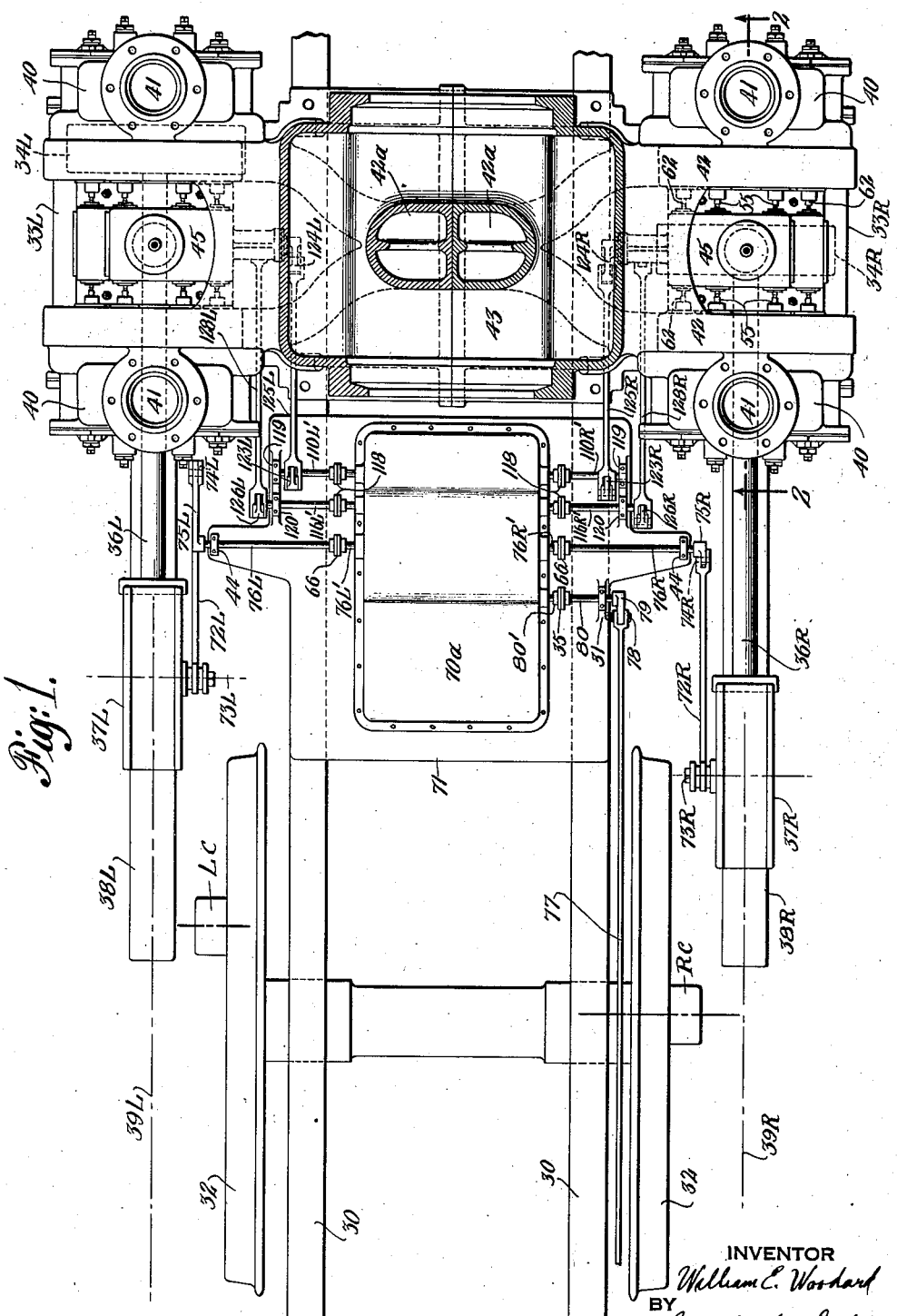
Figure 1 is a plan view of the forward portion of a locomotive chassis (the boiler, smoke-box and other parts being omitted) showing the disposition of the housing of the valve gear of the present invention and a coupling up thereto of the reverse reach rod, the connections from the crossheads, and the connections to the cam boxes of the valve chests. This general arrangement is somewhat similar to that shown in Figure 2 of my said Patent No. 2,138,053, but embodies a cylinder saddle and valve chest arrangement similar to that shown in Figure 2 of my later copending application 186,139 (see my corresponding French Patent 849,182 of Aug. 7, 1939).
Figure 2:
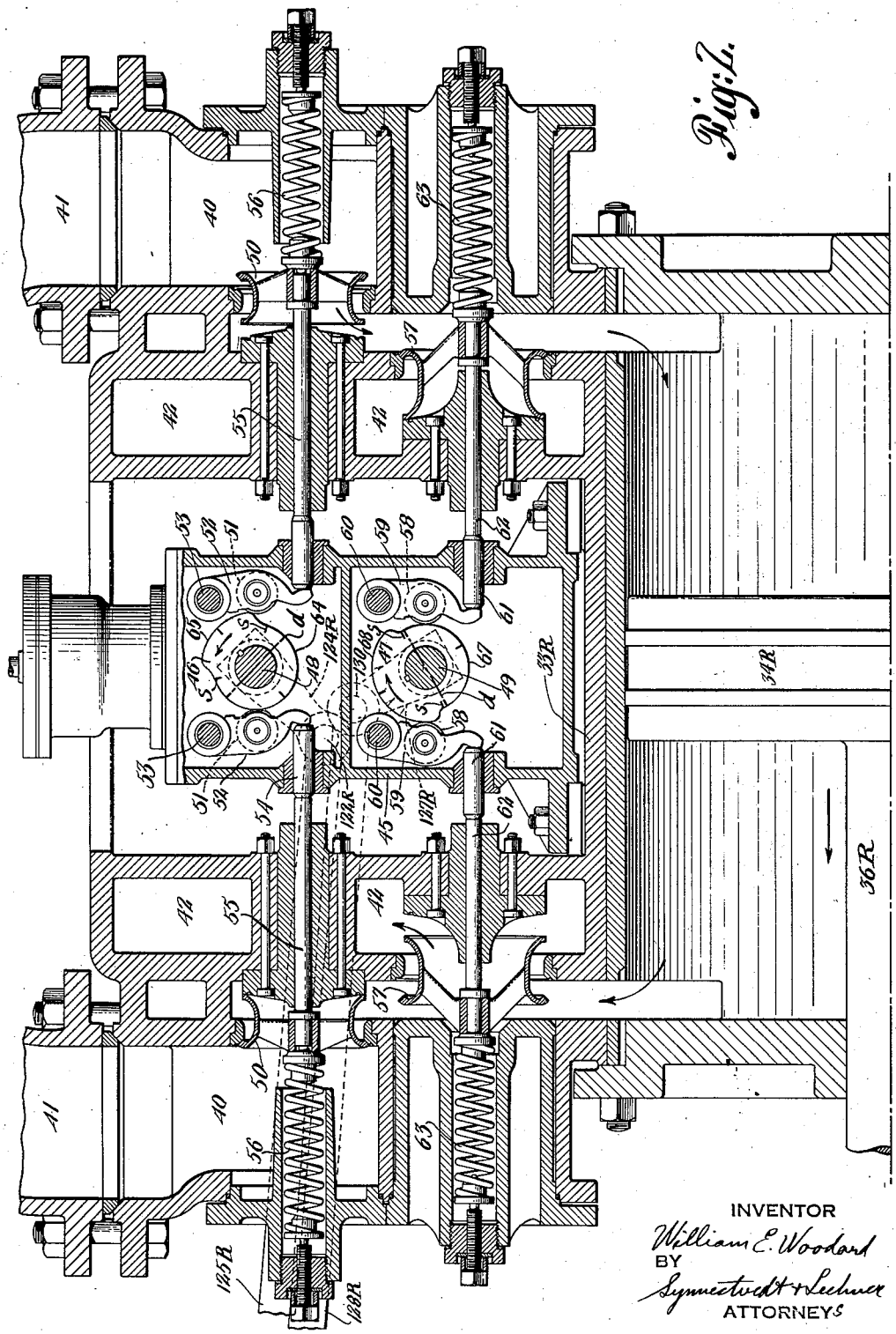
Figure 2 is a somewhat irregular vertical longitudinal section through the right hand cylinder, valve chests and cam box of Figure 1, taken approximately on the line 2—2 of Figure 1 but to a larger scale. The general arrangement of these parts is similar to that shown in Figure 3 of my said copending application 186,139, this figure being employed to show the piston, the valves, the valve cams, and the mode of coupling to the cam shafts the connections which come from the improved valve gear of the present invention.

Referring first to Figures 1 and 2, which illustrate a general locomotive arrangement well adapted for the reception of the preferred embodiment of the present invention, it will be seen that the locomotive has a main frame 30, driving wheels 32, a pair of cylinders 33R, 33L, at the right and left sides respectively, in each of which is a reciprocating piston, 34R and 34L respectively, these being coupled to the main crank pins on a pair of drivers to the rear of the driving wheels shown, by means of piston rods 36R, 36L, crossheads 37R, 37L, slidable in guides 38R, 38L, and connecting rods diagrammatically shown at 39R, 39L. In Figure 1, the upper crosshead guides are omitted, to clearly show the right-hand crosshead 37R at its mid-position, corresponding to a position of the right-hand crank when the same has turned not quite 90° from its forward dead center (the right-hand piston 34R being at the mid-position of its stroke); and showing the left-hand piston 34L and crosshead 37L nearly at their forwardmost position, corresponding to a position of the left-hand crank approaching forward dead center; the two main cranks (not shown) being set approximately 90° apart, in accordance with standard practice. The corresponding cranks on the forward pair of drivers are rather diagrammatically indicated at RC and LC.

It will be noted that the right-hand crank, as viewed in plan, is not directly aligned with the center of the axle, this being due to the normal angularity of the main rod 39R when the piston 34R is at mid-stroke as shown.

Steam is admitted from the boiler of the locomotive to the valve chests 40 (of which there is one at each end of each cylinder) as by branch conduits 41, the two branches for each cylinder, if desired, being joined to a common steam pipe, not shown, in the manner described with reference to Figure 3 of my said copending application 186,139; and the exhaust from the valve chests passes through branched passages 42 to a juncture 42a in the saddle structure 43, and thence through the exhaust nozzle (not shown) to the stack at the top of the smoke-box.

On top of each cylinder is a cam box 45, the cam box for each cylinder enclosing a pair of intake cams 46 and a pair of exhaust cams 47, the two intake cams being in side-by-side relation on their cam shaft 48 and the two exhaust cams being in side-by-side relation on their shaft 49, said two shafts being mounted one above the other, for independent oscillation or rocking.

Although Figure 2 shows only one of the admission cams and one of the exhaust cams, and shows only a single steam admission valve 50 at each end of the cylinder and only one steam exhaust valve 57 at each end of the cylinder, it will be readily seen from Figure 1 (which shows the valve stems and tappets in plan view) that these various parts are duplicated, in side-by-side relation, just as in my prior-filed application No. 186,139.

The intake cams 46 are adapted to actuate the steam valves 50 through the intermediation of cam followers or rollers 51, arms 52 each pivotally mounted at 53, valve tappets 54, and valve stems 55, which latter may be spring-loaded toward valve closing position by the springs 56.

The exhaust cams 47 are adapted to actuate the two exhaust valves 57, through the intermediation of cam followers or rollers 58, arms 59 each pivoted at 60, valve tappets 61, and valve stems 62, which latter may be spring-loaded toward valve closing position, by the springs 63.

The valves shown herein are of the horizontally moving poppet type, although it will be understood that vertically moving poppet valves, or other types of valves, may be employed, by suitably altering the arrangement of the operating levers, stems and the like between the cams and the valves. A single admission valve for each end of each cylinder and a single exhaust valve for each end of each cylinder could of course be employed, but I have herein described the side-by-side multiple arrangement since the same is of substantial practical advantage, as set out more fully in my said copending application No. 186,139.

The oscillating cams may also be of any suitable known types. Thus, each of the intake cams 46 (one of which is shown in Figure 2) has a low or valve seating face 64 and a high or valve lifting face 65, the respective valve being seated when its follower rides down off the surface 65 to the respective striking point S. The head end and crank end striking points are in this embodiment (by way of example and not by way of limitation) located 26½°, respectively, from a common diametral line d.

Similarly, each of the exhaust cams 47 has a low or valve seating surface 67 and a high or valve lifting surface 68, the two striking points S being each angularly positioned (in this particular example) 2½° from a common diametral line d.

*Description of the valve gear*

Turning now to the valve motion mechanism proper, it will be seen from Figures 1 and 3 to 9 inclusive that the motion work is in large part enclosed in the box or casing 70 having a separable portion or cover member 70a, said casing being conveniently removably mounted on a suitable baseplate or other support 71 located on the main longitudinal frame members 30 of the locomotive, just back of the cylinder saddle 43. The motion work is actuated from the crossheads 37R and 37L by means of rods or links 72R, 72L, one on each side of the locomotive, pivotally coupled at 73R, 73L, to the crossheads and at 74R, 74L, to the lower ends of arms 75R, 75L, each such arm being fixed at its upper end upon a rockshaft 76R, 76L, these two shafts being mounted in bearing brackets 44 and disconnectibly coupled at 66 respectively to internal right and left rock-shafts 76R', 76L', which extend out through the right and left-hand walls, respectively, of the casing 70. A reversing rod or reach rod 77 (Figure 1) extends forwardly from the cab (not shown) and is pivotally coupled at 78 to an arm 79 fixed on the reversing shaft 80, which is mounted in a bearing bracket 31 and is coupled at 35 to an extension 80' passing in through a side wall of the casing 70 for the variable adjustment and reversal of the valve gear.

Referring now more particularly to Figures 3 to 9, it will be observed that the actuating rock-shafts 76R', 76L', which are mounted in bearings 81, are secured to and form an oscillating fulcrum for the respective right and left-hand primary oscillating members or transmission levers formed as yokes 83R, 83L, each having an additional pivot or trunnion 82, both of which are mounted in side-by-side bearings 84 in the central bracket or support 85. The oscillating members 83R, 83L, are thus oscillated respectively in synchronism with the right and left-hand pistons of the engine.

Two sets of crossover connections (best seen, respectively, in Figures 5 and 7) are used to transmit motion from the two primary oscillating yokes or transmission levers 83R, 83L, to the left and right-hand oscillating links 86L, 86R. These two arcuate oscillating links, 86R and 86L, are mounted by means of link yokes or brackets 87R and 87L to oscillate on trunnions 88R, 88R' and 88L, 88L', the outermost trunnions being mounted in suitable bearings 89 and the inner trunnions being mounted in side-by-side bearings 90 fixed on the central upstanding support 91.

Figure 5:
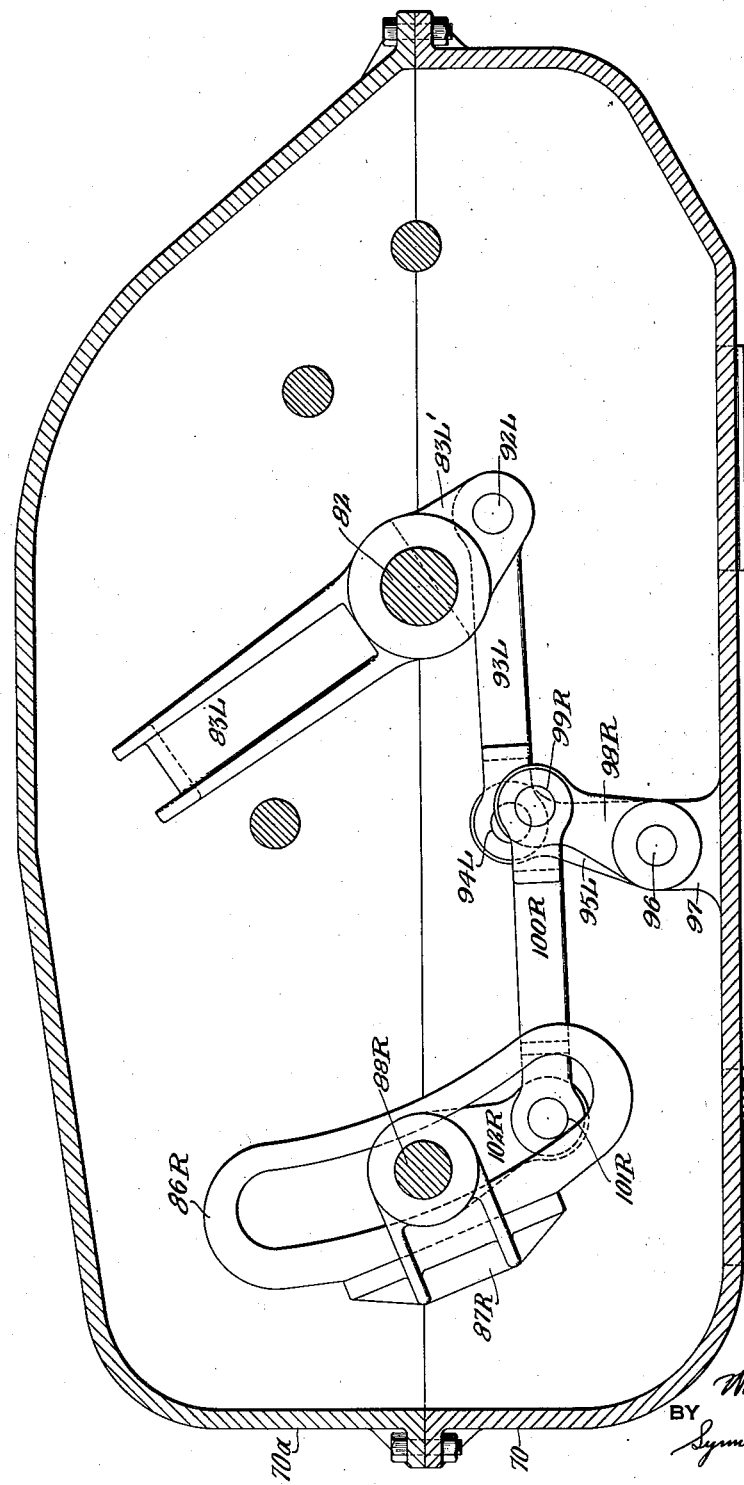
Figure 5 is an irregular longitudinal section, related to Figure 4, omitting a number of the parts shown in Figure 4 but showing said cross-over connection from the left-hand oscillating yoke to the right-hand swinging link.

From Figure 5 (see also Figures 3, 8 and 9), which shows the crossover connection by which the right-hand swinging link 86R is driven from the left-hand primary oscillating yoke 83L, it will be seen that said yoke has a downwardly extending forked arm 83L' to which is pivoted at 92L the forward end of a transmission rod 93L, the rear end of which is pivoted at 94L to a lever 95L which is fixed on a short crossover shaft 96 mounted to rock in a central bearing or support 97. Said short rock-shaft 96 extends across the longitudinal mid-plane of the mechanism and fixedly carries a second lever 98R pivoted at 99R to the forward end of a transmission rod 100R, which latter is coupled at its rear end by the pivot 101R to a lever 102R which is fixed upon the link bracket or yoke 87R. By this system of cross-connection, the right-hand arcuate link 86R is oscillated in unison with the left-hand yoke 83L.

Figure 7:
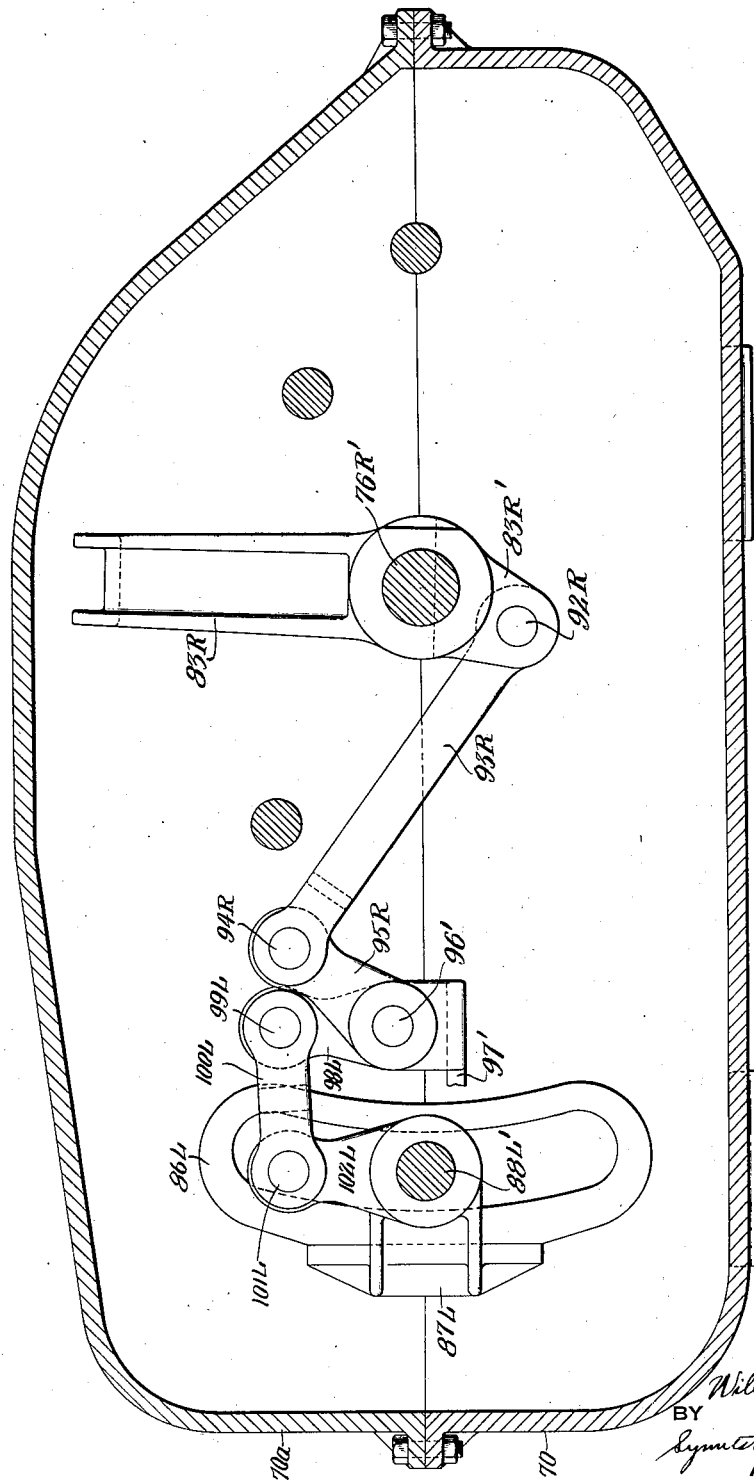
Figure 7 is a section similar to Figure 5 but illustrating the cross-over connection from the right-hand yoke to the left-hand link.
Figure 8:
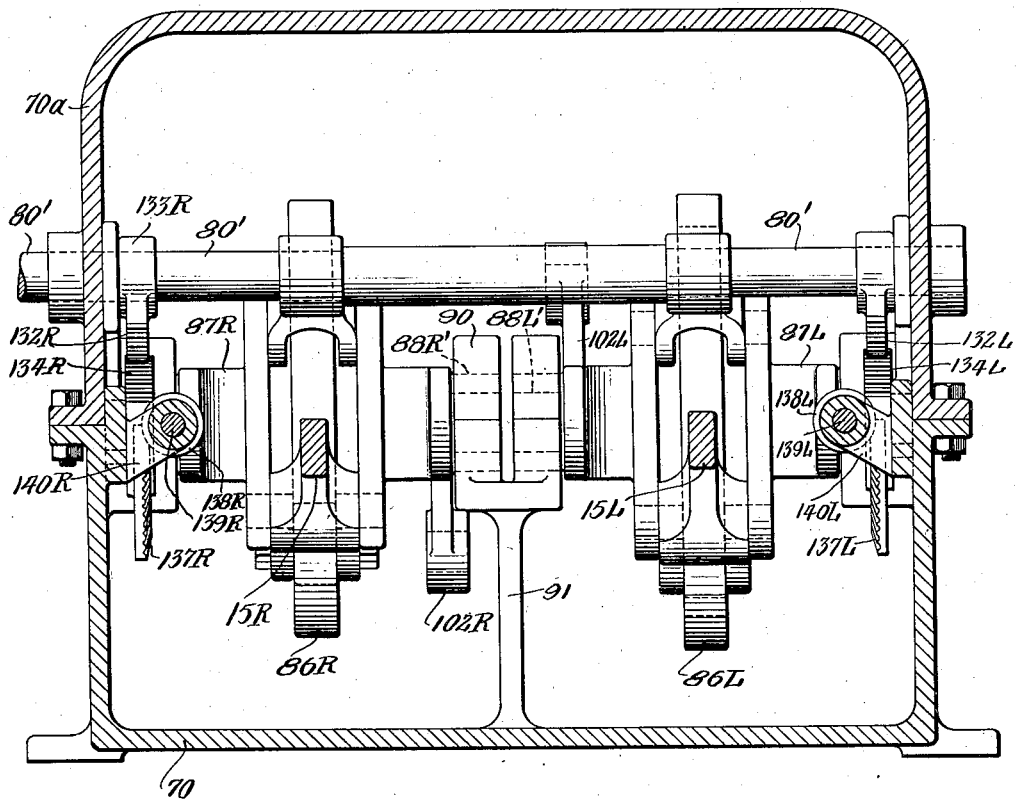
Figure 8 is a transverse section on the line 8—8 of Figure 3.
Figure 9:
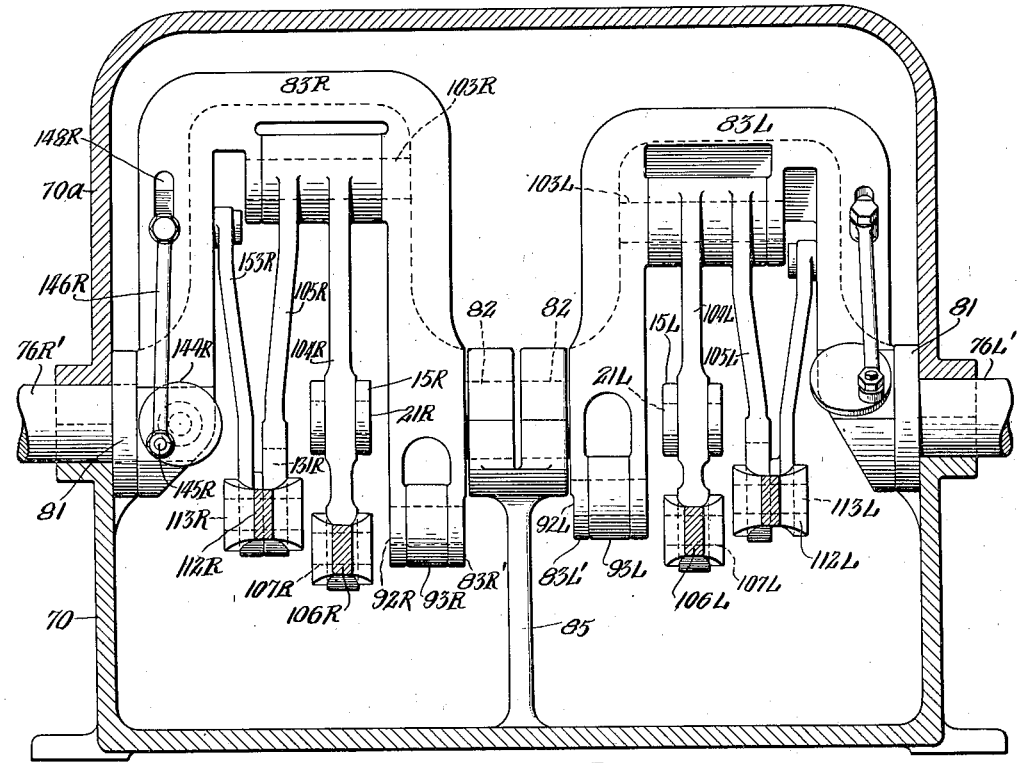
Figure 9 is an irregular transverse section taken approximately on the line 9—9 of Figure 3.
Figure 11:
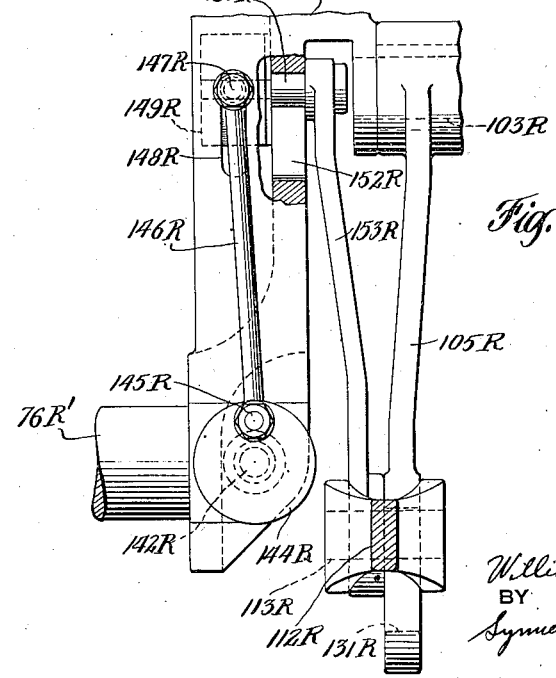
Figure 11 is an elevation taken from the left of Figure 9, with certain parts shown in section.

A similar cross-connection drives the left-hand link 86L from the right-hand yoke 83R, as will appear most clearly from Figure 7 (taken in conjunction with Figures 3, 8 and 9), which shows a downwardly extending forked arm 83R' on the yoke 83R, coupled at 92R to the forward end of the transmission rod 93R, the rear end of which is pivoted at 94R to a lever 95R fixed on a short cross-over shaft 96' mounted on a suitable fixed bracket 97'. At the left side of the center line of the mechanism, the cross-over shaft 96' carries a second fixed lever arm 98L which is pivoted at 99L to the forward end of the short transmission lever 100L, the rear end of which is pivoted at 101L to the upper end of a lever 102L which is fixed to and extends upwardly from the center of oscillation of the bracket member 87L of the left-hand swinging link 86L.

By comparison of Figures 5 and 7, it will be noted that the cross-over connection which actuates the right-hand link from the left-hand yoke is placed relatively low in the casing and is coupled to the link structure below the center of oscillation thereof, whereas the cross-over connection for driving the left-hand link from the right-hand yoke is placed relatively high in the casing and is coupled to the left-hand link structure above its center of oscillation. This is not only for purposes of clearance, but also in order that the left-hand swinging link shall be oscillated in opposite sense to the oscillation of the right-hand yoke, while the right-hand swinging link is oscillated in like sense with the oscillation of the left-hand yoke. As explained more fully in my first-mentioned Patent No. 2,136,405, this is necessary for the proper timing of the valves with relation to the piston movements in the two cylinders, if the reversing mechanism employed moves both the link blocks to the bottom of the links simultaneously (for one direction of movement of the engine) and simultaneously to the top of both links (for reverse operation of the engine). The present invention, though incorporating substantial improvements, thus retains a number of the structural and operational features and advantages of my said earlier filed application.

Figure 3:
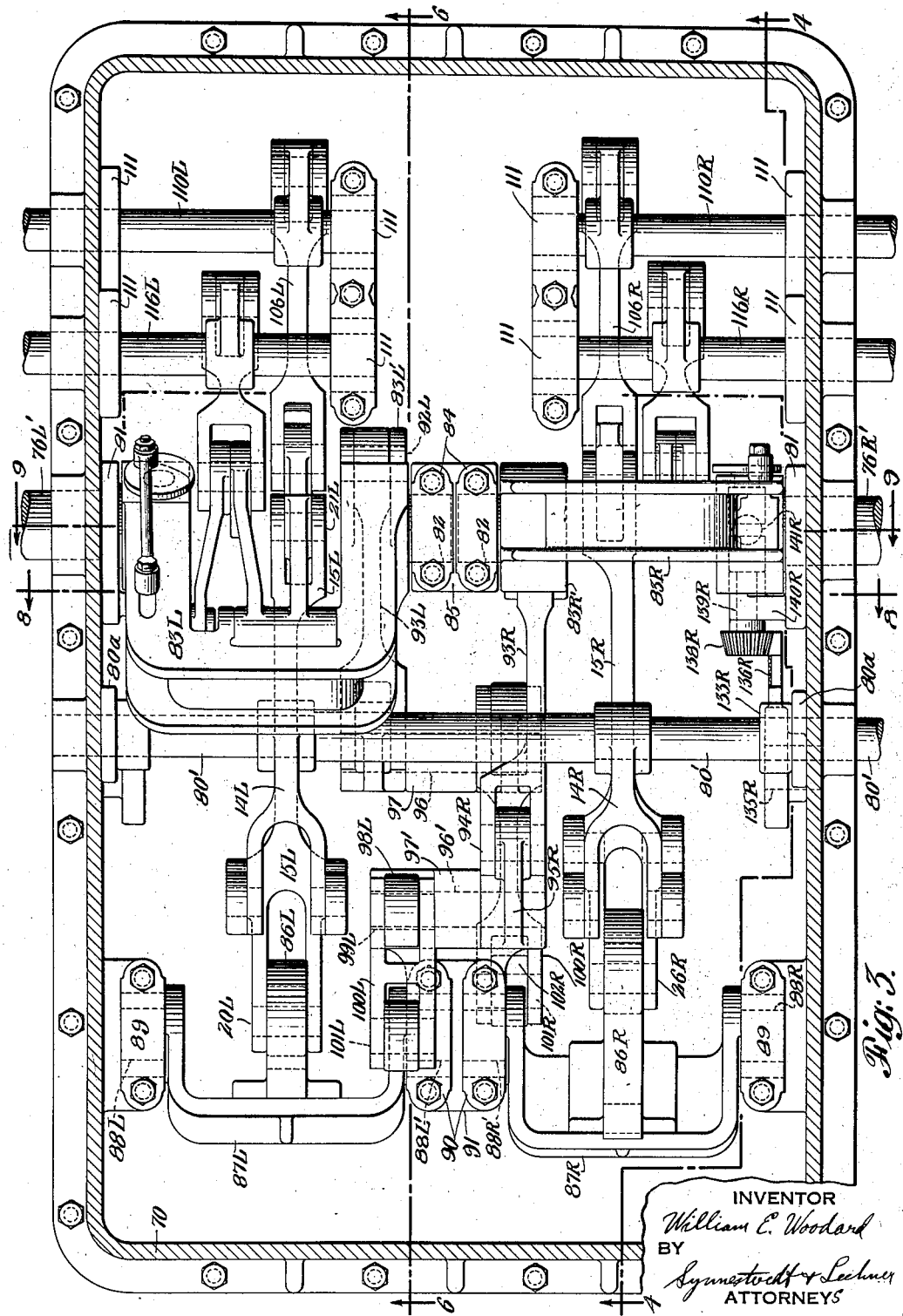
Figure 3 is an irregular horizontal sectional view, to a scale larger than Figure 1, through the valve gear box or casing, taken approximately on the line 3—3 of Figure 4, and illustrating in top plan the working parts of the valve motion mechanism proper which incorporates the present invention.
Figure 4:
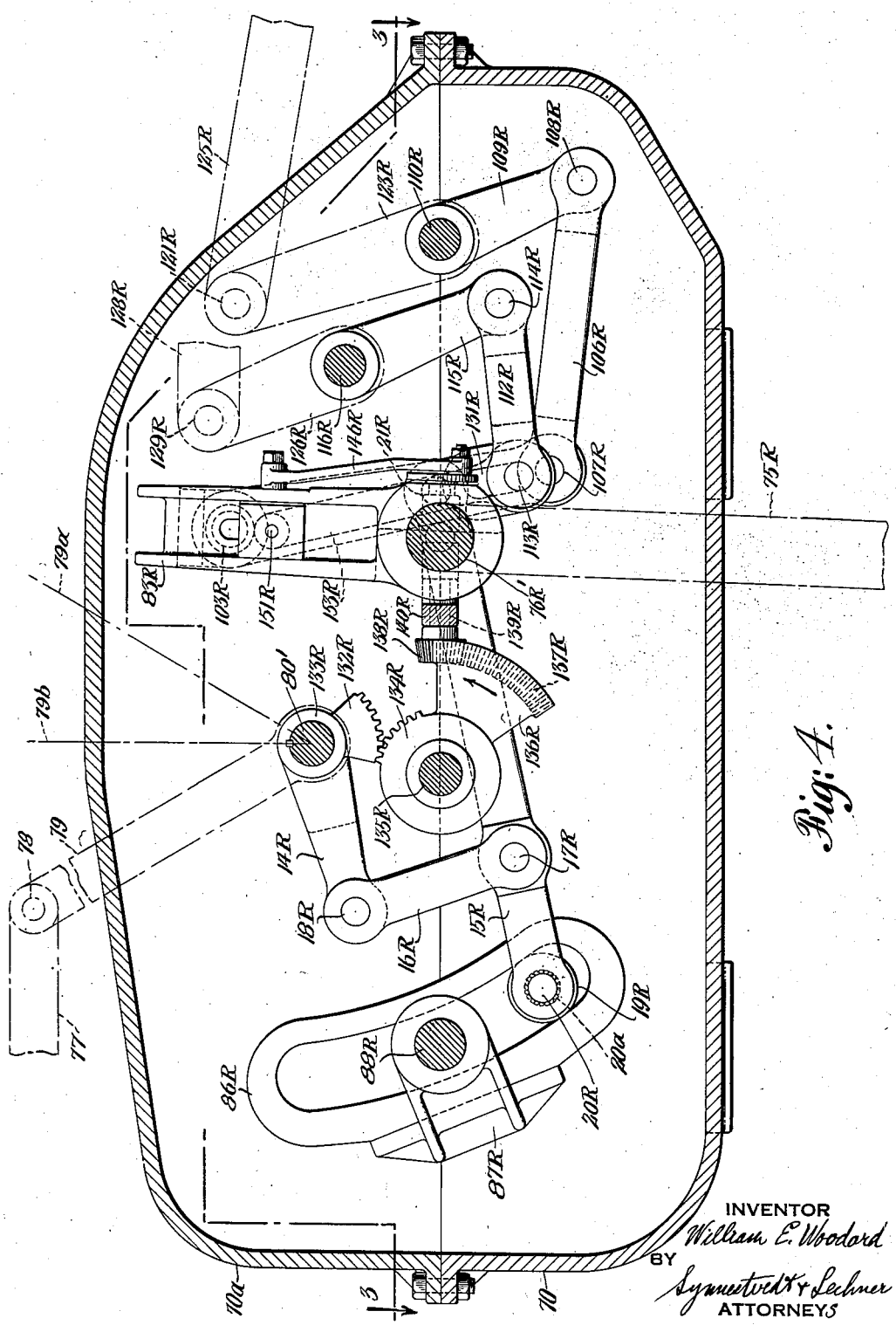
Figure 4 is an irregular vertical longitudinal section taken about on the line 4—4 of Figure 3; showing most of the valve gear parts directly associated with the operation of the valves for the right hand cylinder, but omitting for the sake of clarity the cross-over connection by which the right-hand arcuate swinging link receives its motion.
Figure 6:
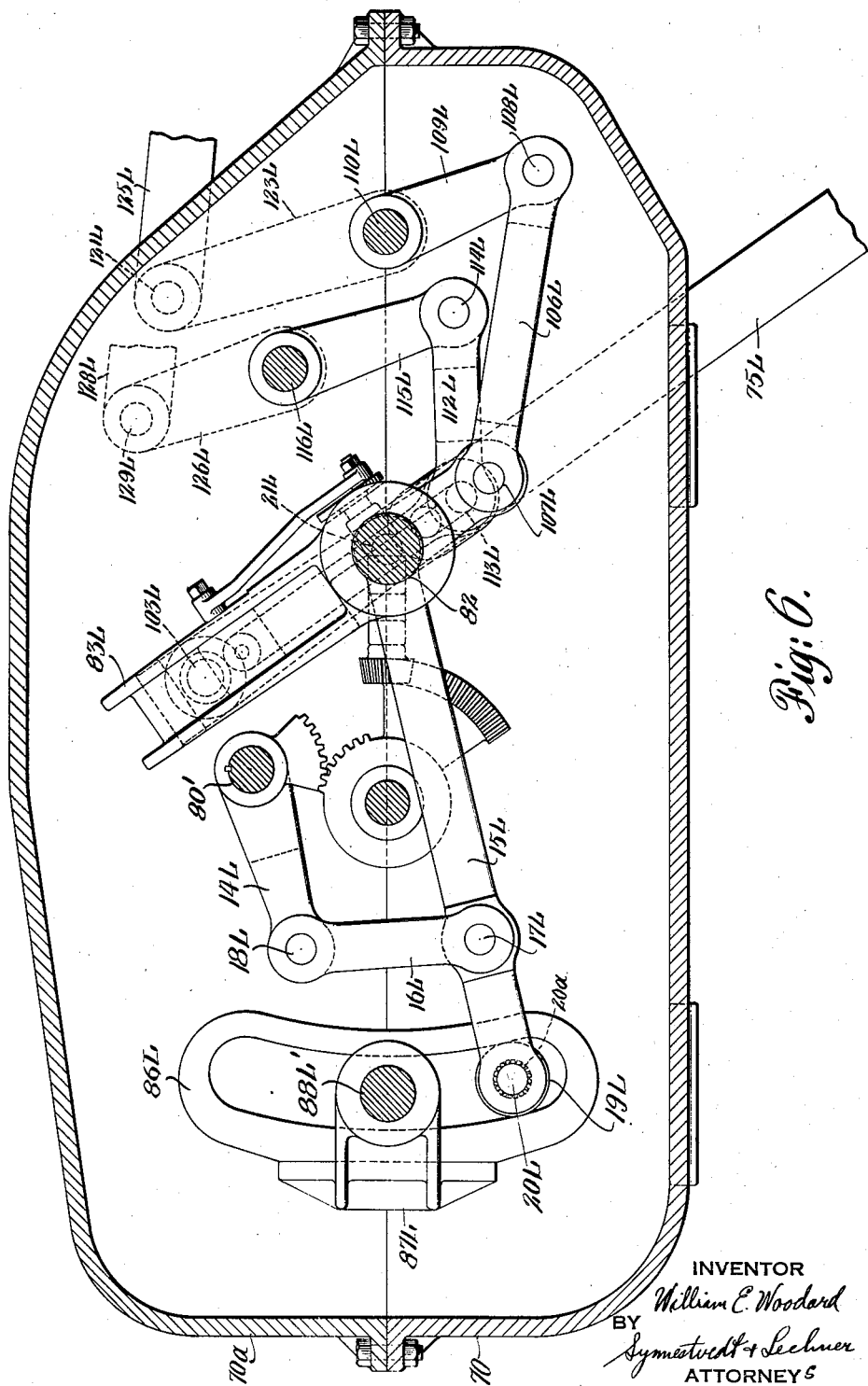
Figure 6 is a section similar to Figure 4, taken about on the line 6—6 of Figure 3, illustrating the major parts of the valve motion directly associated with the operation of the valves for the left-hand cylinder.

Turning now to Figures 3, 4 and 6, it will be seen that the reversing shaft extension 80', mounted in the box by suitable bearings 80a, carries a pair of arms 14R, 14L, which act to raise and lower the radius rods 15R, 15L, through the medium of lifting links 16R, 16L, pivotally coupled to the radius rods by the lower pivot pins 17R, 17L and to the arms by the upper pivot pins 18R, 18L, whereby to alter and reverse the valve gear setting, the radius rods being slidably coupled or associated with the links 86R and 86L by means of rollers 19R, 19L which are pivotally mounted in the rear forked ends of the radius rods by means of the pivot pins 20R, 20L, needle bearings 20a being interposed between each roller and its pivot pin.

In operation, there is an alternating thrust between the links and radius rods, which is also accompanied by a certain relative up-and-down motion of the blocks in the links because of the fact that the lifting links 16R and 16L are oscillating about centers different from the centers of oscillation of the swinging links. By employing the rollers 19R, 19L, instead of the usual sliding link blocks, I secure an alternate rolling contact against one face and then the other of the arcuate link slot, thus largely eliminating friction, wear and vibration. The employment of the needle bearings 20a further makes this feasible without rendering the size and weight of the parts excessive. In fact, by the improved construction and arrangement of the links and link blocks shown herein, I am actually enabled to reduce the size and weight of the links for a valve gear having a certain predetermined range of adjustment of the radius rods, or alternatively to secure an enlarged range of adjustment of the radius rods in links of a certain predetermined overall length, as will now appear:

By reference to Figure 4, it will be seen that the link 86R has its slot formed with semi-circular ends, which gives the greatest strength for a given weight of metal, and also facilitates the initial forming and machining of the link. If the ordinary "square" sliding link block is employed in such a link, it is obvious that the link block cannot be moved in the link beyond the point where the edge of the block approaches the beginning of the semi-circular end of the slot. In fact, it cannot be moved quite to that point, since a certain amount of play of the radius rod and block in the link must be accommodated. With the ordinary square link block, the link is therefore sometimes made with a "square" end, in order to shorten the total length and weight of the link, but this adds to the difficulty of manufacture and does not make as strong a link construction for a given weight. With my improved roller block, however, which makes a line contact with the faces of the link slot, the roller can be moved, toward either extreme of the adjustment, until the diametral line of the roller is closely adjacent to the point where the semi-circular end of the link commences, and the cylindrical surface of the roller can extend well into the half-round end of the slot. It can, in fact, be moved closed to the end of the slot than is shown in Figure 4, or alternatively the link itself can be made shorter and thus lighter, for a given maximum throw of radius rod adjustment.

Referring to Figures 4 and 6, it will be noted that both the radius rods are in their lowermost position, for forward full-gear operation, corresponding to 60% cut-off in this particular example. By forward motion of reverse reach rod 77 and thus of the reversing arm 79 (Figures 1 and 4), the link-blocks or rollers 19R, 19L, and the associated rear ends of the radius rods, can be raised to any desired extent, up to the fullgear reverse position (indicated in Figure 4 by the dotted line 79a, the dotted line 79b indicating mid-gear position of the reversing arm). It is, of course, usual for the main reverse lever in the cab (not shown) to be moved forward for forward locomotive operation, and rearward for reverse operation, but it is obvious that suitable levers or other connections can be made between the main reverse lever in the cab and the reach rod 77, in order that upon forward movement of the main reverse lever the reach rod 77 and the reversing arm 79 will be pulled back to the position shown in Figure 4 (forward full-gear position of the valve motion), and that upon rearward movement of the main reverse lever, the reach rod and reversing arm 79 will be moved forward to the position indicated at 79a (corresponding to reverse full-gear position of the valve motion) or to any intermediate position.

The forward ends of the radius rods 15R, 15L, are pivotally connected at 21R, 21L, to the combining levers which are pivotally mounted respectively at 103R, 103L, in the right and left-hand primary oscillating members 83R, 83L.

As best seen in Figure 10, the right-hand combining lever assembly, which combines the motion of the oscillating yoke 83R derived from the right-hand crosshead with the motion of the link 86R derived from the left-hand crosshead, comprises a combining lever arm 104R for operating the steam admission valves of the righthand cylinder, and a second combining lever arm 105R for operating the steam exhaust valves of the right-hand cylinder, these two arms being integrally pivoted on the pin 103R. In other words, two separate valve actuating connections are taken off from the combining lever structure considered as a unit; the effective length or throw of the exhaust arm 105R of the combining lever being shorter than that of the admission controlling arm 104R. The same is true of the combining lever mechanism 104L, 105L, for the left-hand side of the engine.

The double take-off from the combining lever mechanism comprises, for the two sides of the engine, steam valve driving rods 106R, 106L, pivotally coupled at 107R, 107L, to the combining levers, and at their forward ends pivotally coupled at 108R, 108L, to the lower ends of arms 109R, 109L, fixed respectively on valve actuating rock-shafts 110R, 110L, which are mounted in anti-friction bearings 111 and pass out through the side walls of the casing.

Similarly, for the exhaust valve actuating take-off, the mechanism comprises actuating rods 112R, 112L, which are pivotally coupled at 113R, 113L, to the arms 105R, 105L, and are at their forward ends pivotally coupled at 114R, 114L, to the lower ends of arms 115R, 115L, fixed on the exhaust valve actuating rock-shafts 116R, 116L, which latter are similarly journaled in bearings 111 and extend out through the side walls of the box. Disconnectible couplings 118 are provided externally thereof, for connecting the various internal shafts to their external extensions 110R', 110L', 116R', 116L', which latter are supported by outboard bearings carried on suitable brackets 119, 120 (see Figure 1).

The extreme outer ends of the steam valve actuating rock-shafts 110R', 110L', are connected to the respective steam admission cam shafts 48 in the cam boxes 45, by means of levers 123R, 123L, fixed on said rock-shafts, levers 124R, 124L, fixed on said cam shafts, and interconnecting links 125R, 125L, said connecting links 125R and 125L being respectively pivotally coupled at 121R, 121L, to the upper ends of the arms 123R, 123L (see Figures 4 and 6), and being pivotally coupled at their forward ends at 122R, 122L, to the said cam shaft levers 124R, 124L (see Figures 1 and 2).

Similarly, the outer ends of exhaust valve actuating rock-shafts 116R', 116L', are coupled to the respective exhaust cam shafts 49 in the cam boxes 45, by means of levers or arms 126R, 126L, fixed on said rock-shafts, arms 127R, 127L, fixed on said exhaust cam shafts 49, and interconnecting links 128R, 128L, pivotally coupled to said arms, as shown at 129R, 129L and 130R, 130L.

With cams, valves and associated parts of the configuration and arrangement shown in Figure 2, the valve motion mechanism as above described can be arranged to effect (by way of example and not by way of limitation), a steam cut-off at 60% of the piston stroke when the valve motion mechanism is in full-gear position (the position shown in Figures 1 to 9 inclusive). As seen in Figures 1 and 2, with the locomotive operating in forward motion, the right-hand piston at mid-position in the cylinder, and steam working on the head end of said piston, steam from pipe 41 is passing the open steam valve 50 (at the head end) and is flowing into the cylinder through the portage, as shown by the arrows. The admission cam 46 is at this moment being turned by the valve motion in a counterclockwise direction, as shown in Figure 2, and is approaching the point of cut-off, which will take place when the piston 34R has traveled 60% of its stroke. The admission valve 50 at the crank end of the cylinder remains closed, of course, at this time.

At this same moment the exhaust valve 57 at the crank end is open, and the exhaust steam in that end of the cylinder is going past said valve and through the exhaust conduit 42 to the exhaust outlet 42a, as indicated by the arrows. The exhaust cam 47 is turning clockwise toward the position where it will permit closure of the open valve 57, whereby to effect compression, which occurs when the piston 34R has yet to traverse 11.6% of its stroke toward the crank end.

Similar operations occur, of course, at the left-hand cylinder, but in a phase relation corresponding to a 90° relative angularity of the two cranks.

Up to this point, the mechanism as described with reference to Figures 1 to 9 inclusive is in principle similar to the valve motion mechanism illustrated and claimed in my aforementioned Patent No. 2,138,053, but with the incorporation of certain important structural improvements as hereinabove described, and it is in this type of valve gear that the major improvements of the present case (relating to the timing of the valves) are preferably incorporated, as will now be described with especial reference to Figures 3 to 14 but particularly Figures 10 to 14.

*Description of the major novel features of the present invention*

Reference will now be made chiefly to Figures 10 to 14. According to the present invention, which from here on will be described with reference to the right-hand side of the mechanism, the exhaust valve rod member 112R is coupled to the exhaust combining lever member 105R as before stated, by means of the pivot pin 113R. However, instead of the pivot pin 113R being always at a fixed point on the combining lever, as is the pivot 107R for the admission valve connection, the exhaust pivot connection is slidable vertically in a slot 131R formed in the exhaust combining lever member 105R. Thus the combined motion delivered by said lever for the timing of the exhaust valves can be progressively adjusted or varied; the particular variation secured by the slidable mounting of the pivot point 113R being a variation in the ratio of the lever arms of the exhaust combining member 105R, as will appear in more detail later on.

It will now be evident that this adjustment of effective length of the exhaust combining lever member 105R, taken together with the adjustment of the link block 19R in the link 86R, gives a controllable variation of the components of both motions entering into the combination for timing the exhaust valves; whereas, for the admission, only one of the motions entering into the combination is varied, i. e., the motion derived from said link.

The resultant relative alteration between the timing of the release and compression events on the one hand and the timing of the admission and cut-off events on the other hand, is coordinated or coupled up with the normal cut-off adjustment of the valve gear, by the mechanism now to be described.

Referring to Figure 4, the reversing shaft 80' has fixed thereon a fragmentary pinion 132R, the hub of which is indicated at 133R (see also Figure 3). The teeth of this pinion are in engagement with those of a second partial pinion or gear 134R which is mounted on an axis or pin 135R secured or journaled in the inner face of the side wall of the casing 70. Integral with the gear member 134R is a large gear sector 136R having bevel teeth 137R in engagement with a bevel pinion 138R which is fixed on shaft 139R rotatably mounted in bearings 140R at the inner face of the casing wall.

At its forward end, the rotatable shaft 139R is connected by a universal joint 141R (the details of which appear in Figure 12) to a stub shaft 142R mounted in a bearing 143R secured in the oscillating transmission lever 83R, the center of the universal joint being on the axis of oscillation of the member 83R, i. e., in line with the actuating shaft 76R'. It is desirable also that the universal joint be of the "ball" type, such for example as the Mollart "ME" joint, or any equivalent universal, the rotative motion of which is uniform at, or unaffected by, various angularities of the connected shafts.

The shaft 142R carries a crank or eccentric, formed of a disk 144R and a pin or stud 145R, on which is pivoted the lower end of a push rod 146R the upper end of which carries a pivot member 147R which has a shank slidable in the vertical slot 148R formed in the oscillating yoke or lever 83R near the upper end of the latter.

The said upper pivot member 147R also has a threaded end (see Figure 13) extending into a block 149R which is vertically slidable in a guideway 150R formed in the oscillating yoke member 83R. The channel-shaped cross-section of the yoke thus makes the same strong and light, and at the same time forms such guideway. To said block 149R is pivoted by the pin 151R (vertically slidable in the slot 152R) the upper end of a lifting link 153R, the lower end of which is coupled to the pivot pin 113R whereby to vertically shift the point of connection of the exhaust valve operating rod 112R to the exhaust combining lever member 105R.

All the adjusting mechanism above described with reference to Figures 9 to 14, as well as the actuating gearing associated with the reversing shaft, (as best seen in Figures 3, 4, 6 and 8) is, of course, duplicated on the left side, the reference characters for which are identified by the letter L, and since the two sides are the same, except for their phase relation, it will be unnecessary to describe the parts on that side.

*Description of operation*

With the valve motion parts located and proportioned substantially as illustrated in the drawings, and with admission and exhaust valve means such as shown or any suitable equivalent thereof, the mechanism may be assumed to produce in full-gear position (which is the position illustrated) a timing of valve events as follows: 1st, admission (which may be termed "pre-admission"), occurring slightly before the commencement of the working stroke of the piston; 2nd, cut-off, occurring at 60% of the stroke; 3rd, release, accurring at 91%; and 4th, compression, with 11.6% of the return stroke to be completed.

At the specified cut-off of 60% the foregoing events quite closely approximate those produced at a like cut-off with the valve motion of my above-mentioned Patent No. 2,138,053, which already represented an improvement over my prior Patent No. 2,136,405, as may be seen by reference to the specification of Patent No. 2,138,053. At earlier cut-offs, however, the mechanism of the instant case produces very substantial improvements over the structures of both of said prior applications. This improvement is accomplished by the variable alteration of the combined motion delivered for the timing of the exhaust valves as compared with the admission valves, and specifically by the progressive alteration of the ratio of the arms of the combining lever member which is connected to actuate the exhaust valves. In a typical example (though not by way of limitation), referring to Figure 10, the lever arm from the center of pin 103R to the center of pin 107R may be 11⅝", the lever arm from the center of pin 103R to the center of pin 113R may be 10½", and the lever arm from the center of pin 103R to the center of pin 21R may be 7½". Such construction would therefore give an admission or intake combining lever ratio of $$\frac{11\tfrac{5}{8}''}{7\tfrac{1}{2}''}$$

and would give an exhaust combining lever ratio of $$\frac{10\tfrac{1}{2}''}{7\tfrac{1}{2}''}$$

at 60% cut-off, i. e., in full gear position. With an upward adjustment of pin 113R in slot 131R (as shown in Figure 14) the exhaust lever arm ratio can be varied from the ratio just given to a ratio for example of $$\frac{9''}{7\tfrac{1}{2}''}$$

at the earliest feasible cut-offs.

Since the mechanism shown in Figures 10 to 13 is coupled up with the reversing shaft 80', it is obvious that the adjustment of the ratio of lever arms of the exhaust combining lever member is under the control of the reversing lever, and the resulting adjustment is in a predetermined relation to the cut-off adjustment. The gears 132R, 134R, 137R and 138R are so proportioned that when the reverse mechanism is in neutral or "mid-gear" position, the mid-point of the gear 137R is in engagement with the bevel gear 138R, and the eccentric pin 145R has just reached the top of its stroke, as seen in Figure 14. As the reversing lever 79 and shaft 80' continue to turn clockwise (viewed in Figure 4), so as to lift the radius rod 15R and the link-roller 19R to the top of link 86R (i. e., full-gear reverse position), the gear sector 136R has completed its upward stroke in the direction of the arrow, and the eccentric pin 145R (Figure 10) has returned to its lowermost position upon the opposite side of the center of the stub shaft 142R.

Thus, with one complete movement of the reverse lever, moving the radius rod from one extreme position to the other in the swinging link (in either direction), the exhaust combining lever adjustment goes through a complete cycle, i. e., from its greatest ratio, corresponding to maximum cut-off, to its smallest ratio, corresponding to mid-gear position, and back to its greatest ratio again, corresponding to maximum cut-off in the opposite running direction of the valve gear.

Assuming now, in operation, that the pre-admission remains constant, or nearly so, for all cut-off adjustments, the following table gives the comparative release and compression points at several different cut-offs; first for the mechanism of my prior Patent No. 2,136,405; second for my other Patent No. 2,138,053; and finally for the mechanism of the instant case. To show the progressive results with the present mechanism, three different cut-offs are given for the latter.

*Single take-off from combining lever, for operating both the admission and exhaust valves (U. S. Patent 2,138,053).*

Ratio of arms of combining lever, both intake and exhaust $\frac{11\frac{5}{8}''}{7\frac{1}{2}''}$

| Cut-off | Release point percent of stroke | Compression point percent from end of return stroke |
|---|---|---|
| 60% | 86.6 | 17.6 |
| 15% | 60.5 | 47.1 |

*Double take-offs from combining lever, one for admission and one for exhaust (U. S. application 121,398)*

Ratio of arms of combining lever, intake $\frac{11\frac{5}{8}''}{7\frac{1}{2}''}$, exhaust $\frac{10\frac{1}{2}''}{7\frac{1}{2}''}$

| Cut-off | Release point percent of stroke | Compression point percent from end of return stroke |
|---|---|---|
| 60% | 89.7 | 12.5 |
| 15% | 63.2 | 43.3 |

*Double take-offs from combining lever, with variable ratio of exhaust lever arms (structure of the instant case)*

Ratio of intake combining lever arms, $\frac{11\frac{5}{8}''}{7\frac{1}{2}''}$ (exhaust lever arms varied as shown below)

| Cut-off | Exhaust lever-arm ratio | Release point percent of stroke | Compression point percent from end of return stroke |
|---|---|---|---|
| 60% | $\frac{10\frac{1}{2}''}{7\frac{1}{2}''}$ | 91 | 11.6 |
| 25% | $\frac{9\frac{3}{4}''}{7\frac{1}{2}''}$ | 82.25 | 26 |
| 15% | $\frac{9''}{7\frac{1}{2}''}$ | 76.5 | 34 |

The above readings were taken from full-size working models, in which the major structural parts, including the cams and valves (which per se are not a part of the invention), were similar, with the exception, of course, that in the structure of the second application separate combining lever arms of different fixed ratios were employed for operating the separate admission and exhaust valves, and in the structure of the instant case the ratio of the arms of the exhaust combining lever is made variable.

From the foregoing it will now be clear that the present invention secures the various advantages set out at the first part of this specification, and notably that there is obtained a marked improvement in the exhaust valve events, particularly at early cut-off adjustments. It will also be clear, without further amplification, that when the present invention is incorporated in a general setting or environment similar to that disclosed in one or more of my three prior filed copending applications above referred to, the novel advantages of the present invention are superimposed upon the advantageous features of said prior arrangements, the features of the present invention operating in harmony with many of the features shown in said earlier applications.

Certain subject matter common to this case and my copending application 256,874, filed February 17, 1939, is claimed in said copending application.

I claim:

1. In a distribution valve gear for locomotive engines or the like having for each cylinder separately acting admission and exhaust valve means, a combining lever, apparatus for actuating the same from a plurality of moving parts of the engine, mechanism for delivering motion from the combining lever to the admission valve means, other mechanism for delivering motion from said combining lever to the exhaust valve means, and means for controllably altering the motion taken from the combining lever to one of said mechanisms as compared with the other.

2. In a distribution valve gear for locomotive engines or the like having for each cylinder separately acting admission and exhaust valve means, a combining lever, apparatus for actuating the same from a plurality of moving parts of the engine, mechanism for delivering motion from the combining lever to the admission valve means, other mechanism for delivering motion from said combining lever to the exhaust valve means, and means for controllably altering the motion taken from the combining lever for delivery to the exhaust valve means relative to that taken from the combining lever for delivery to the admission valve means.

3. For a fluid pressure engine having cylinders, pistons and moving parts actuated thereby, and relatively movable admission valve means and exhaust valve means for said cylinders, a valve gear having actuating connections from a plurality of said parts moving in different phase relation and comprising mechanism for combining the motions derived from said parts and for varying the component of one of the motions utilized for the timing of one of said valve means, and mechanism for combining the motions derived from said parts and for varying the component of each of the motions utilized for the timing of the other of said valve means.

4. For a fluid pressure engine having cylinders, pistons and moving parts actuated thereby, and relatively movable admission valve means and exhaust valve means for said cylinders, a valve gear having actuating connections from a plurality of said parts moving in different phase relation and comprising mechanism for combining the motions derived from said parts and for varying the component of one of the motions utilized for the timing of the admission valve means, and mechanism for combining the motions derived from said parts and for varying the component of each of the motions utilized for the timing of the exhaust valve means.

5. For a fluid pressure engine having relatively movable admission and exhaust valves, a valve gear comprising combining lever mechanism, actuating connection means from said mechanism to an admission valve, actuating connection means from said mechanism to an exhaust valve, and means for adjusting one of said connection means relative to the other.

6. For a fluid pressure engine having relatively movable admission and exhaust valves, a valve gear comprising combining lever mechanism, actuating connection means from said mechanism to an admission valve, actuating connection means from said mechanism to an exhaust valve, means for adjusting one of said connection means relative to the other, together with a control for adjusting the valve gear, and means for actuating said adjustment means from said control.

7. For a locomotive engine or the like, having cylinders, pistons and parts reciprocated by said pistons, and relatively movable admission valve means and exhaust valve means for said cylinders, a valve motion mechanism comprising, for the valve means of each cylinder, a member driven by a reciprocating part actuated by the piston in said cylinder and oscillating in synchronism therewith, a swinging member such as an arcuate link, oscillated by another of said parts out of phase with the first named oscillating member, mechanism for variably combining the motions of both said members for the actuation and timing of the valve means for said cylinder and including separate actuating connections to the admission valve means and the exhaust valve means, and further including means for reversing one of the motions relative to the other entering into the combination, and apparatus actuated by the reversing means for simultaneously variably adjusting said connections to one of said valve means.

8. For a locomotive engine or the like, having cylinders, pistons and parts reciprocated by said pistons, and relatively movable admission valve means and exhaust valve means for said cylinders, a valve motion mechanism comprising, for the valve means of each cylinder, a member driven by a reciprocating part actuated by the piston in said cylinder and oscillating in synchronism therewith, a swinging member such as an arcuate link, oscillated by another of said parts out of phase with the first named oscillating member, mechanism for variably combining the motions of both said members for the actuating and timing of the valve means for said cylinder and including separate actuating connections to the admission valve means and the exhaust valve means, and further including means for reversing one of the motions relative to the other entering into the combination, and apparatus actuated by the reversing means for simultaneously variably adjusting said connections to one of said valve means, said apparatus including reciprocable adjustment means mounted on said oscillating member, shafting interconnecting the reversing means and said adjustment means, and a universal joint in said shafting to accommodate the oscillation of said member.

9. For a locomotive engine having at each side a cylinder, relatively movable admission and exhaust valve means therefor, a piston, and a reciprocating part moving with the piston, a valve gear comprising a combining lever, apparatus for actuating the same from said two reciprocating parts of the engine, mechanism for delivering motion from said combining lever to the exhaust valve means of the engine separately from the delivery of motion to the admission value means, and means for controllably altering the ratio of the arms of said combining lever, whereby to vary the timing of the exhaust valve events with respect to the timing of the admission valve events.

10. For a locomotive engine having at each side a cylinder, relatively movable admission and exhaust valve means therefor, a piston, and a reciprocating part moving with the piston, a valve gear comprising a combining lever, apparatus for actuating the same from said two reciprocating parts of the engine, means for varying one of the actuating motions delivered to the combining lever, mechanism for delivering motion from said combining lever to the exhaust valve means of the engine separately from the delivery of motion to the admission valve means, and means for controllably altering the ratio of the arms of the combining lever, whereby to vary the timing of the exhaust valve events with respect to the timing of the admission valve events.

11. For a locomotive engine having at each side a cylinder, relatively movable admission and exhaust valve means therefor, a piston, and a reciprocating part moving with the piston, a valve gear comprising a combining lever, apparatus for actuating the same from said two reciprocating parts of the engine, means for varying one of the actuating motions delivered to the combining lever, mechanism for delivering motion from said combining lever to the exhaust valve means of the engine separately from the delivery of motion to the admission valve means, means for controllably altering the ratio of the arms of the combining lever, whereby to vary the timing of the exhaust valve events with respect to the timing of the admission valve events, and a common control for both said means.

12. For a locomotive engine having at each side a cylinder, relatively movable admission and exhaust valve means therefor, a piston, and a reciprocating part moving with the piston, a valve gear comprising a combining lever, apparatus for actuating the same from said two reciprocating parts of the engine, means for varying one of the actuating motions delivered to the combining lever, mechanism for delivering motion from said combining lever to the exhaust valve means of the engine separately from the delivery of motion to the admission valve means, means for controllably altering the ratio of the arms of the combining lever, whereby to vary the timing of the exhaust valve events with respect to the timing of the admission valve events, and a common control for both said means coupled to adjust them in a predetermined relation.

13. For a locomotive engine having at each side a cylinder, relatively movable admission and exhaust valve means therefor, a piston, and a reciprocating part moving with the piston, a valve gear comprising a combining lever, apparatus for actuating the same from said two reciprocating parts of the engine, adjustable means for reversing one of the actuating motions delivered to the combining lever, mechanism for delivering motion from said combining lever to the exhaust valve means of the engine separately from the delivery of motion to the admission valve means, adjustable means for altering the ratio of the arms of the combining lever whereby to vary the timing of the exhaust valve events with respect to the timing of the admission valve events, and a common control for both said adjustable means.

14. For a locomotive engine having at each side a cylinder, relatively movable admission and exhaust valve means therefor, a piston, and a reciprocating part moving with the piston, a valve gear comprising a combining lever, apparatus for actuating the same from said two reciprocating parts of the engine, adjustable means for varying the amplitude and reversing the direction of one of the actuating motions delivered to the combining lever, mechanism for delivering motion from said combining lever to the exhaust valve means of the engine separately from the delivery of motion to the admission valve means, adjustable means for altering the ratio of the arms of the combining lever whereby to vary the timing of the exhaust valve events with respect to the timing of the admission valve events, and a common control for both said adjustable means.

15. For a locomotive engine or the like, having a cylinder, a piston, and associated reciprocating parts at each side, a valve motion mechanism comprising an oscillating member for each side actuated in synchronism with a reciprocating part at that side, a swinging link or the like for each side, and cross-connections for actuating each link respectively from the oscillating member at the opposite side, said cross-connections each comprising a transverse rock-shaft, one positioned higher than the other, and links and levers coupling the opposite ends of each cross-shaft to the respectively opposite swinging links and oscillating members, the connection to one of said swinging links being above its center of oscillation and the connection of the other being below its center of oscillation, by which arrangement clearance is provided between the two cross-connections and at the same time one of the swinging links is oscillated in like sense with the oscillating member which drives it and the other swinging link is oscillated in opposite sense with the oscillating member which drives it.

16. For a locomotive engine or the like, having at each side a cylinder, a piston, a reciprocating part actuated by the piston, relatively movable steam admission and steam exhaust valve means, a single rock-shaft actuated by each of said two reciprocating parts and extending inwardly to an intermediate region between the two cylinders, and other rock-shafts extending outwardly from said region and having connections to the admission and exhaust valve means, a valve motion mechanism located in said intermediate region and comprising for each side a primary oscillating member actuated by one of said first mentioned rock-shafts, said two oscillating members being disposed in side-by-side juxtaposition, a pair of oscillating link members disposed in side-by-side juxtaposition, a combining lever assembly carried by each of said primary oscillating members, at each side a radius rod adjustably connecting the link at that side to the corresponding combining lever assembly, said combining lever assemblies having connections to the second named rock-shafts, and cross-connections from each primary oscillating member to the link at the opposite side, said cross-connections each comprising a short transverse crossover-shaft, the two crossover-shafts being spaced apart vertically and longitudinally, a pair of upwardly extending levers on each crossover-shaft, one adjacent each side of the longitudinal center line of the mechanism, an arm for each primary oscillating member extending downwardly below the center of oscillation thereof, a connecting link between each such arm and one of the levers on one of said crossover-shafts, an arm for each of said links, one extending upwardly from the center of oscillation of its link and the other extending downwardly from the center of oscillation of its link, a connecting link coupling said upwardly extending arm to the remaining lever on the uppermost crossover-shaft, and a connecting link coupling the said downwardly extending arm to the remaining lever on said lowermost crossover-shaft.

17. For a locomotive engine or the like, a valve gear comprising a combining lever, an oscillating member to which said lever is pivoted, a valve driving connection adjustably coupled to said lever for variation of the effective length thereof, controllable mechanism for varying the adjustment, and means mounting parts of said mechanism on said oscillating member.

18. For a locomotive engine or the like, a valve gear comprising a combining lever, an oscillating member to which said lever is pivoted, a valve driving connection adjustably coupled to said lever for variation of the effective length thereof, controllable mechanism for varying the adjustment, and means mounting parts of said mechanism on said oscillating member including a guideway in said oscillating member for movement of said parts toward and away from the center of oscillation of said member.

19. For a locomotive engine or the like, a valve gear comprising a combining lever, an oscillating member to which said lever is pivoted, a valve driving connection adjustably coupled to said lever for variation of the effective length thereof, controllable mechanism for varying the adjustment, and means mounting parts of said mechanism on said oscillating member including stiffening flanges on said oscillating member positioned and configured to provide a guideway for certain of said parts.

20. In valve motion mechanism for steam engines, an oscillatable yoke having trunnions, through one of which said yoke is adapted to be oscillated from a moving part of the engine, pivot means on said yoke adapted to mount a combining lever, and guide means on said yoke adapted to receive relatively slidable adjustment mechanism for altering the lever arm ratio of an associated combining lever.

21. In an engine valve gear, a combining lever embodying an admission valve actuating member and an exhaust valve actuating member, and means for adjusting the effective length of one of said members.

22. In valve motion mechanism for fluid pressure engines, a swinging link member, a radius rod member associated therewith for actuation thereby, means for effecting relative adjustment between said members, a rolling contact element rotatably mounted in the radius rod member and having its periphery formed to fit and to ride longitudinally in said link member, and rolling bearings forming part of the rotatable mounting of said element, said element itself forming the outer race for said bearings.

23. In valve motion mechanism, a swinging link formed with a slot having a substantially semicircular end, a radius rod having a roller positioned to operate in said slot, and rolling bearings mounting said roller on said radius rod, said roller having its inner periphery configured as an outer race for said bearings and its outer periphery configured to fit the curved end of the link slot, whereby a reduction in size and weight of the link is attainable concurrently with the incorporation of the anti-friction bearings.

WILLIAM E. WOODARD.

CERTIFICATE OF CORRECTION.

Patent No. 2,234,614.                                March 11, 1941.

WILLIAM E. WOODARD.

It is hereby certified that error appears in the printed specification of the above numbered patent requiring correction as follows: Page 4, first column, line 75, after "76R," insert --or--; page 5, second column, line 23, for the word "closed" read --closer--; page 7, first column, line 62, for "accurring" read --occurring--; page 8, first column, line 5, for the patent number "2,138,053" read --2,136,405--; line 20, for "application 121,398" read --Patent 2,138,053--; page 9, first column, line 64, claim 9, for the word "value" read --valve--; and that the said Letters Patent should be read with this correction therein that the same may conform to the record of the case in the Patent Office.

Signed and sealed this 22nd day of April, A. D. 1941.

(Seal)
Henry Van Arsdale,
Acting Commissioner of Patents.